(12) United States Patent
Groll et al.

(10) Patent No.: US 7,651,572 B2
(45) Date of Patent: Jan. 26, 2010

(54) DISHWASHER WITH AN ENERGY-SAVING HEATING MODE AND METHOD THEREFOR

(75) Inventors: Hubert Groll, Moedingen (DE); Michael Rosenbauer, Reimlingen (DE); Ernst Stickel, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 477 days.

(21) Appl. No.: 10/539,862

(22) PCT Filed: Dec. 10, 2003

(86) PCT No.: PCT/EP03/14018

§ 371 (c)(1), (2), (4) Date: May 5, 2006

(87) PCT Pub. No.: WO2004/054426

PCT Pub. Date: Jul. 1, 2004

(65) Prior Publication Data

US 2006/0249180 A1  Nov. 9, 2006

(30) Foreign Application Priority Data

Dec. 17, 2002  (DE) .................. 102 59 062

(51) Int. Cl.
- *B08B 3/10* (2006.01)
- *B08B 7/04* (2006.01)
- *B08B 9/20* (2006.01)

(52) U.S. Cl. .................. 134/18; 134/56 D; 134/25.2; 134/57 D

(58) Field of Classification Search .................. 134/18, 134/56 R, 25.2, 57 D
See application file for complete search history.

(56) References Cited

U.S. PATENT DOCUMENTS

| 4,249,090 A | * | 2/1981 | Cushing | 307/154 |
|---|---|---|---|---|
| 4,289,543 A | * | 9/1981 | Vallor | 134/25.2 |
| 4,331,484 A | * | 5/1982 | Helwig, Jr. | 134/18 |
| 4,689,089 A | * | 8/1987 | Eberhardt et al. | 134/18 |
| 6,571,564 B2 | * | 6/2003 | Upadhye et al. | 62/3.3 |
| 7,104,269 B2 | * | 9/2006 | McKee | 134/56 D |

FOREIGN PATENT DOCUMENTS

| DE | 1 226 248 B1 | 10/1966 |
|---|---|---|
| DE | 197 58 062 A1 | 7/1999 |
| DE | 197 58 063 A1 | 7/1999 |
| DE | 197 58 064 A1 | 7/1999 |
| EP | 0 593 876 A1 | 4/1994 |
| EP | 1 082 938 A2 | 3/2001 |

OTHER PUBLICATIONS

International Search Report for PCT/EP2003/014018, May 8, 2004.

* cited by examiner

*Primary Examiner*—Michael Kornakov
*Assistant Examiner*—Natasha Campbell
(74) *Attorney, Agent, or Firm*—James E. Howard; Andre Pallapies

(57) ABSTRACT

A method for executing a washing program in a dishwasher includes a spray system for spraying a washing liquid within a dishwasher onto crockery that has been disposed in the dishwasher as a washing program is executed. Before such spraying of the washing liquid, the washing liquid is heated to a predetermined temperature in a flow section that is separate from the spray system to an extent such that the washing liquid does not substantially impinge on crockery in the dishwasher as it is being heated in the flow section, whereupon the washing liquid is heated without substantially wetting crockery in the dishwasher. After the washing liquid has been heated to the predetermined temperature, the washing liquid is sprayed onto crockery, whereupon crockery in the dishwasher that essentially has not been heated is heated by the washing liquid.

9 Claims, No Drawings

DISHWASHER WITH AN ENERGY-SAVING HEATING MODE AND METHOD THEREFOR

BACKGROUND OF THE INVENTION

The invention relates to a dishwasher with an energy-saving heating mode and a method for operating such a dishwasher.

In conventional dishwashers, a washing liquid, usually called a washing solution, is heated during individual sub-program steps, e.g., "cleaning" and "rinsing" and the washing solution wets the dishes located in the dishwasher by means of a spraying system provided, for example, spray arms. As a result of the continuous circulation and action of the washing solution on the dishes and uniform heating of the washing solution, not only the washing solution is heated but also the dishes to be cleaned and the washing container and the materials arranged directly adjacent thereto, for example, insulating material.

In order to finally heat a washing solution to a specific temperature provided by the washing program, a total amount of energy which takes into account the heating of the dishes and the washing container in addition to the washing solution must be expended.

For example, at the beginning of the cleaning phase, a first partial quantity of the washing solution is heated to a temperature, for example 65° C. and guided onto the dishes by means of the spraying system. As a result of the lower temperature of the dishes of about 20 to 24° C., the first partial quantity of the washing solution delivers a certain quantity of heat to the dishes so that the temperature of the dishes increases but the temperature of the washing solution decreases. The partial quantity of the washing solution thus cooled flows back via the circulating pump and is further heated until a specific temperature is reached. As a result of this continuous process, both the dishes and also areas of the washing container are heated to this predetermined temperature before the desired washing solution temperature is reached.

However, since only the temperature of the washing solution is important for achieving the desired cleaning performance, the energy balance of the dishwasher is disadvantageously influenced by the heating of the dishes and the washing container.

SUMMARY OF THE INVENTION

It is thus the object of the invention to provide a dishwasher and a method to reduce the energy required to heat the washing liquid in the best possible manner.

This object is solved by the method according to the invention having the disclosed exemplary features and by the dishwasher having the features according to the disclosed exemplary aspects. Advantageous further developments of the present invention are characterized by the dependent claims.

DETAILED DESCRIPTION OF THE EXEMPLARY EMBODIMENTS OF THE PRESENT INVENTION

In the method for reducing the energy consumption during a sub-program step, e.g. "pre-wash", "cleaning", "intermediate rinse" and "rinsing" in a washing program, e.g. "Universal 55", "Intensiv 70" or synonymous designations in a dishwasher, in a first step the washing liquid is heated to a predetermined temperature and during this heating phase the washing liquid is substantially not guided onto the dishes in the dishwasher and the washing liquid heated to the predetermined temperature is only guided onto the dishes, which have essentially not been heated, in a second step.

Advantageously, the heating phase is ended at the latest when the dishes have reached the predetermined temperature for the washing liquid. More appropriately, the temperature of the dishes can be determined by means of a temperature sensor which is placed in the washing container preferably on a wall of the washing container or at an otherwise suitable place.

Advantageously the washing liquid is circulated by means a circulating pump so that the heat distribution inside the washing liquid is substantially homogeneous. For example, a valve circuit controllable by the program control system opens a preferably substantially closed circuit, embodied as a flow section and separate from the spraying system, for circulating the washing liquid so that during this heating phase the washing liquid cannot reach the dishes via the spraying system. During the heating phase the washing liquid only circulates in this closed pipe system and is only introduced into the spraying system after reaching a predetermined temperature.

In another advantageous embodiment of the present invention no valve control is provided since wetting of the dishes by the washing liquid is prevented by the circulating pump circulating the washing liquid at a low pressure during the heating phase so that only a small quantity of liquid can escape from the spraying device associated with the lower basket. After reaching the desired temperature of the washing liquid, the circulating power is increased by the program control so that the spraying systems can act on the dishes with suitably heated washing liquid in accordance with the performance specification.

In a further preferred embodiment of the present invention, a separate container is provided in the dishwasher, which is provided with a heating device and heats the washing liquid without being circulated before this is circulated by the circulating pump and finally wets the dishes.

The method according to the invention and the dishwasher according to the invention achieve the advantage of substantially saving the energy used to heat the dishes since only the washing liquid is heated by suitable measures (its own flow section, lower circulating pump power or separate heating container) before this reaches the dishes.

In the application of the method according to the invention it is further taken into account that the temperature difference between the heated washing liquid and the dishes is not so great that the dishes are damaged as a result of the jump in temperature. For this purpose means for manually switching on and off the method according to the invention are provided on the dishwasher according to the invention. This is because if the method according to the invention is used, for example, for dishes made of crystal or ceramic, the rapid increase in temperature can cause cracks in the crystal and thus total loss of the crystal crockery or when ceramic is used, it can result in hairline cracks in the glazing. The dishwasher according to the invention advantageously has a button on the control panel whereby the method according to the invention can be switched on and off.

The invention claimed is:

1. A method for executing a washing program in a household dishwasher, the method comprising:
    within the dishwasher having:
        a housing having a washing compartment;
        a crockery retainer that statically retains crockery that is to be washed in the washing compartment of the dishwasher;

a flow section, which is disposed within the housing of the dishwasher, that circulates a washing liquid therein to be subsequently sprayed onto the crockery as a washing program is executed, wherein the flow section heats the washing liquid to a predetermined temperature; and a spray system for spraying the washing liquid onto the crockery that has been disposed statically in the dishwasher only after the washing liquid has been heated to the predetermined temperature by the flow section, wherein the flow section is separate from the spray system such that the washing liquid does not substantially impinge on the crockery in the washing compartment of the dishwasher as the washing liquid is being circulated and heated in the flow section, and wherein the flow section includes:
  a valve circuit controllable by a program control system and forming a substantially closed circuit that circulates the washing liquid; and
  a heater for heating the washing liquid being circulated in the valve circuit of the flow section to the predetermined temperature only in the flow section, providing the washing liquid to be eventually sprayed by the spray system, as the washing program is executed, onto the crockery in the dishwasher;

heating the washing liquid to the predetermined temperature in the flow section that is separate from the spray system to an extent such that the washing liquid does not substantially impinge on the crockery in the dishwasher as the washing liquid is being heated in the flow section, whereupon the washing liquid is heated without substantially wetting the crockery in the dishwasher; and after the washing liquid has been heated to the predetermined temperature, delivering the washing liquid into contact with the crockery in the dishwasher, whereupon the crockery in the dishwasher that essentially has not essentially been heated is heated by the washing liquid.

2. The method according to claim 1, wherein the heating the washing liquid to the predetermined temperature in a flow section includes heating the washing liquid in the flow section embodied separate from the spraying system as the valve circuit controllable by the program control system as the substantially closed circuit and circulating the washing liquid in the valve circuit such that the washing liquid does not substantially impinge on the crockery in the dishwasher as the washing liquid is being heated in the valve circuit.

3. The method according to claim 1, wherein the heating the washing liquid to the predetermined temperature in a flow section includes ceasing the heating of the washing liquid at a latest when crockery in the dishwasher has reached the predetermined temperature for the washing liquid.

4. The method according to claim 1, wherein the heating the washing liquid to the predetermined temperature in a flow section includes circulating the washing liquid using a circulating pump such that a heat distribution inside the washing liquid is substantially homogeneous.

5. The method according to claim 1, wherein the heating the washing liquid to the predetermined temperature in a flow section includes heating the washing liquid to a specific temperature in a preheating container.

6. A household dishwasher comprising:
  a housing having a washing compartment;
  a crockery retainer that statically retains crockery that is to be washed in the washing compartment of the dishwasher;
  a flow section, which is disposed within the housing of the dishwasher, that circulates a washing liquid therein to be subsequently sprayed onto the crockery as a washing program is executed, wherein the flow section heats the washing liquid to a predetermined temperature; and
  a spray system for spraying the washing liquid onto the crockery in the dishwasher only after the washing liquid has been heated to the predetermined temperature by the flow section,
  wherein the flow section is separate from the spray system such that the washing liquid does not substantially impinge on the crockery in the washing compartment of the dishwasher as the washing liquid is being circulated and heated in the flow section, and
  wherein the flow section includes:
    a valve circuit controllable by a program control system and forming a substantially closed circuit that circulates the washing liquid; and
    a heater for heating the washing liquid being circulated in the valve circuit of the flow section to the predetermined temperature only in the flow section.

7. The dishwasher according to claim 6, further comprising:
  a circulating pump, which is disposed within the housing, that circulates the washing liquid in the valve circuit of the flow section such that the heat distribution inside the washing liquid is substantially homogeneous.

8. The dishwasher according to claim 6, wherein the heater is a container provided with a heating device.

9. The dishwasher according to claim 6, further comprising:
  a switch for manually switching an operation of the heater between an on condition in which the heater is operable to heat the washing liquid and an off condition in which the heater does no heat the washing liquid.

* * * * *

UNITED STATES PATENT AND TRADEMARK OFFICE
CERTIFICATE OF CORRECTION

PATENT NO.       : 7,651,572 B2                                   Page 1 of 1
APPLICATION NO.  : 10/539862
DATED            : January 26, 2010
INVENTOR(S)      : Groll et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Twenty-third Day of November, 2010

David J. Kappos
*Director of the United States Patent and Trademark Office*